United States Patent
Ito et al.

(10) Patent No.: US 8,616,484 B2
(45) Date of Patent: Dec. 31, 2013

(54) SEATBELT RETRACTOR (75) Inventors: Katsuhiro Ito, Yokohama (JP); Kenichi Morizane, Yokohama (JP)

(73) Assignee: Autoliv Development AB, Vårgårda (SE)

(*) Notice: Subject to any disclaimer, the term of this patent is extended or adjusted under 35 U.S.C. 154(b) by 258 days.

(21) Appl. No.: 13/145,367

(22) PCT Filed: Dec. 24, 2009

(86) PCT No.: PCT/JP2009/071382
§ 371 (c)(1),
(2), (4) Date: Jul. 20, 2011

(87) PCT Pub. No.: WO2010/084687
PCT Pub. Date: Jul. 29, 2010

(65) Prior Publication Data
US 2011/0297776 A1 Dec. 8, 2011

(30) Foreign Application Priority Data
Jan. 20, 2009 (JP) .................. 2009-009755

(51) Int. Cl.
*B65H 75/48* (2006.01)
(52) U.S. Cl.
USPC ........................................... 242/374
(58) Field of Classification Search
USPC ..................... 242/374; 60/632, 634, 638
See application file for complete search history.

(56) References Cited

U.S. PATENT DOCUMENTS

| | | | | |
|---|---|---|---|---|
| 6,345,504 | B1* | 2/2002 | Takehara et al. | 60/638 |
| 6,532,739 | B2* | 3/2003 | Kameyoshi et al. | 60/638 |
| 6,663,037 | B2* | 12/2003 | Matsumura | 242/374 |
| 6,669,131 | B2* | 12/2003 | Takehara et al. | 242/374 |
| 6,722,600 | B2* | 4/2004 | Hamaue et al. | 242/374 |
| 7,124,974 | B2* | 10/2006 | Shiotani et al. | 242/374 |
| 7,631,831 | B2* | 12/2009 | Hiramatsu | 242/374 |

FOREIGN PATENT DOCUMENTS

| | | |
|---|---|---|
| JP | 5-25634 | 4/1993 |
| JP | 2001-163182 | 6/2001 |
| JP | 2001-224407 | 8/2001 |
| JP | 2002-145012 | 5/2002 |
| JP | 2002-154405 | 5/2002 |
| JP | 2005-190906 | 7/2005 |
| JP | 2008 273447 | 11/2008 |

OTHER PUBLICATIONS

International Search Report from International Application PCT/JP2009/071382 Mailed on Feb. 2, 2010 (one page).

* cited by examiner

*Primary Examiner* — Sang Kim
(74) *Attorney, Agent, or Firm* — Brinks Gilson & Lione (57) ABSTRACT

A pretensioner includes a gas generator, a pinion, a tube pipe, a piston ball, a plurality of balls, and a tube cover. The tube pipe includes a tubular part that is formed continuously from one end portion to the other end in order to receive the piston ball and the plurality of balls. A hook portion formed at the other end portion is angled toward the pinion. A tip end part of the hook portion is attached to at least one of a refractor frame and the tube cover. With this construction, a reduction in an engagement amount between the pinion and the balls during operation of the pretensioner can be prevented, and as a result, the pinion can be rotated efficiently.

5 Claims, 6 Drawing Sheets

Prior Art

SEATBELT RETRACTOR

BACKGROUND

1. Field of the Invention

The present invention relates to a seatbelt retractor, and more particularly to a seatbelt retractor provided with a pretensioner for removing looseness in a seatbelt during a vehicle emergency, such as a vehicle collision.

2. Related Technology

Recently, seatbelt retractors have been provided with a pretensioner that causes a spindle to retract using a gas pressure generated by igniting an explosive or gas generating medium during a vehicle collision. Examples of such devices are shown in Japanese Patent Application Publication No. 2001-163182 (Patent Document 1), Japanese Patent Application Publication No. 2002-145012 (Patent Document 2), and Japanese Patent Application Publication No. 2002-154405 (Patent Document 3).

Figure 6:
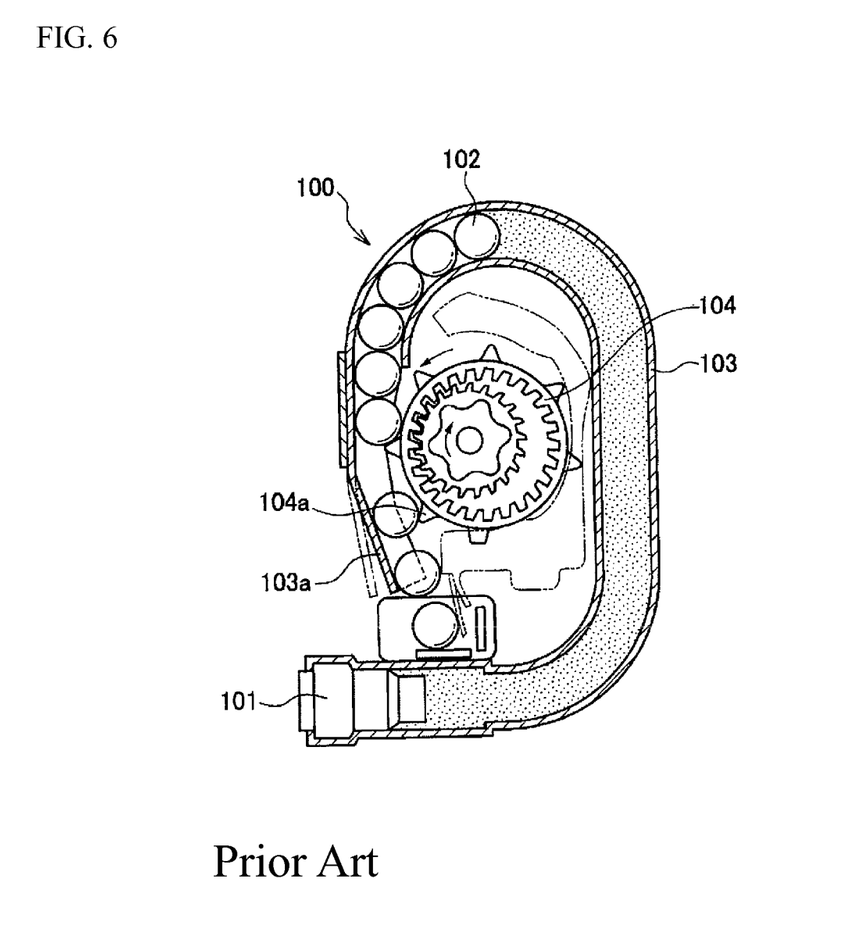
FIG. 6 is a sectional view showing a conventional seatbelt retractor.

In a retractor 100 described in Patent Document 1, as shown in FIG. 6, balls 102 are moved through a pipe 103 by a gas pressure from a gas generator 101. The moving balls 102 engage with a ring gear 104 causing the ring gear 104 to rotate, and as a result, a spindle, that is integrally formed with the ring gear 104, is rotated in a retraction direction.

Further, the retractor 100 is applied to an apparatus, including an energy absorption mechanism that absorbs energy by causing a torsion bar to twist. The torsion bar twists such that a seat belt is unreeled when a load of at least a set value acts on the seat belt during a vehicle collision. A final guide portion 103a of the pipe 103 is formed so as to be easily deformable. Therefore, when the energy absorption mechanism is activated during an operation of the pretensioner such that the balls 102 are pushed in a direction heading back into the pipe 103, the final guide portion 103a of the pipe 103 flexes, thereby widening a passage of the balls 102. As a result, levers 104a of the ring gear 104 are prevented from catching on and stopping the balls 102.

Incidentally, with the retractor 100 described in Patent Document 1, the guide portion 103a, which is provided in a tip end portion of the pipe 103, is not fixed. Therefore, the balls 102 attempt to escape from the ring gear 104 due to an engagement angle between the ball 102 and the ring gear 104 during operation of the pretensioner. As a result, the amount of engagement between the ring gear 104 and the ball 102 decreases, leading to a reduction in an amount of transmitted force, and, therefore, the ring gear 104 cannot be rotated efficiently.

SUMMARY

The present invention has been designed in consideration of the circumstances described above. Accordingly, an object thereof is to provide a seatbelt retractor that can prevent a reduction in the amount of engagement between a rotary member and a rolling body during operation of a pretensioner so that the rotary member can be rotated efficiently.

In overcoming the drawbacks and limitations of the known technology, in one aspect, the present invention provides a seatbelt retractor including:

a spindle for retracting a seatbelt;

a refractor frame having a pair of side plates that support the spindle so that the spindle is free to rotate; and a pretensioner that rotates the spindle in a retraction direction using a gas pressure generated when a gas generating medium is ignited, wherein the pretensioner includes:

gas pressure generating means for generating the gas pressure;

a rotary member that rotates integrally with the spindle;

a guide member disposed around the rotary member and to a side of a side plate of the refractor frame, the gas pressure generating means being attached to one end portion side thereof;

a piston member that is accommodated in the guide member and pushed directly by the gas pressure from the gas pressure generating means; and a plurality of rolling bodies that are accommodated in the guide member and cause the rotary member to rotate by moving in accordance with a movement of the piston member, the guide member includes a tubular part formed continuously from the one end portion in order to accommodate the piston member and the plurality of rolling bodies, and a hook portion bent to the rotary member side at the other end portion, and a tip end part of the hook portion is fixed to the retractor frame so as to be incapable of moving relative thereto.

In a further aspect, seatbelt retractor includes a guide member cover that is attached to the side plate of the retractor frame so as to cover the guide member, wherein the tip end part of the hook portion is fixed to at least one of the retractor frame and the guide member cover.

In another aspect of the invention, the hook portion extends along a tangent of a concentric circle with the rotary member.

In a further aspect of the invention, a part of the guide member near the rotary member is cut away in the hook portion and an engagement portion where the rolling bodies engage with the rotary member.

In yet another aspect of the invention, the tubular part of the guide member is held such that during an operation of the pretensioner, the tubular part can be moved by a reactive force received by the rolling bodies when the rolling bodies engage with the rotary member.

With the seatbelt refractor according to the present invention, the guide member includes the tubular part formed continuously from the end portion in order to accommodate the piston member and the plurality of rolling bodies, to the hook portion that is bent toward the rotary member side at the other end portion. By extending the flexed part of the hook portion using the reactive force that are received by the rolling bodies from the rotary member, the engagement amount between the rotary member and the rolling bodies can be prevented from decreasing during operation of the pretensioner. As a result, the rotary member can be rotated efficiently.

DETAILED DESCRIPTION

A preferred embodiment of a seatbelt retractor according to the present invention will be described in detail below on the basis of the drawings. This application is based on Japanese Patent Application 2009-009755, which was filed on Jan. 20, 2009, the entire contents of which are incorporated herein by reference.

Figure 1:
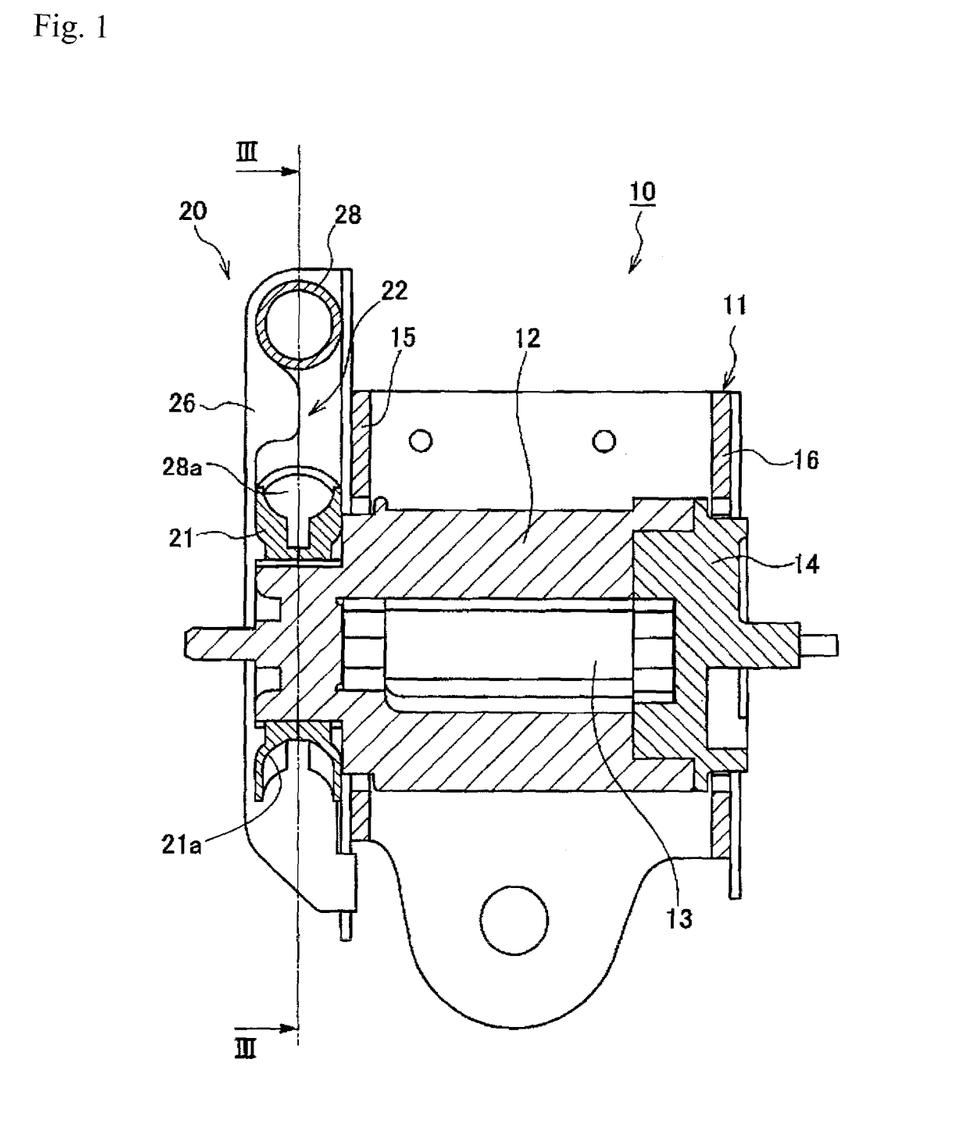
FIG. 1 is a sectional view of a seatbelt retractor according to the principles of the present invention.

As shown in FIG. 1, a seatbelt retractor 10 according to an embodiment of the present invention includes a spindle 12 supported rotatably on a retractor frame 11 in order to retract a webbing, the latter of which is not shown in the drawings, a torsion bar 13 that is mounted in the spindle 12 and extends along an axial center of the spindle 12, one axial end portion of the torsion bar 13 being joined to the spindle 12 and a tread head 14 being joined to the other axial end portion of the torsion bar 13. The torsion bar 13 constitutes a force limiter mechanism that unreels the webbing while absorbing energy when a load equal to or greater than a set load acts on the webbing.

The retractor frame 11 is made of metal, and includes a first side plate 15, which is positioned on the left side of FIG. 1, connected by a back plate to a second side plate 16, which is positioned on the right side of FIG. 1. Thus, the retractor frame 11 has a substantially C-shaped form. A pretensioner 20 and a retraction spring device, not shown in the drawings, are attached to the first side plate 15. Locking means, not shown in the drawings, is provided on the second side plate 16. The locking means includes sensors, such as vehicle acceleration detecting means and webbing unreeling acceleration detecting means, and prevents the webbing from rotating in an unreeling direction during a vehicle emergency by engaging the tread head 14 with the refractor frame 11.

Figure 2:
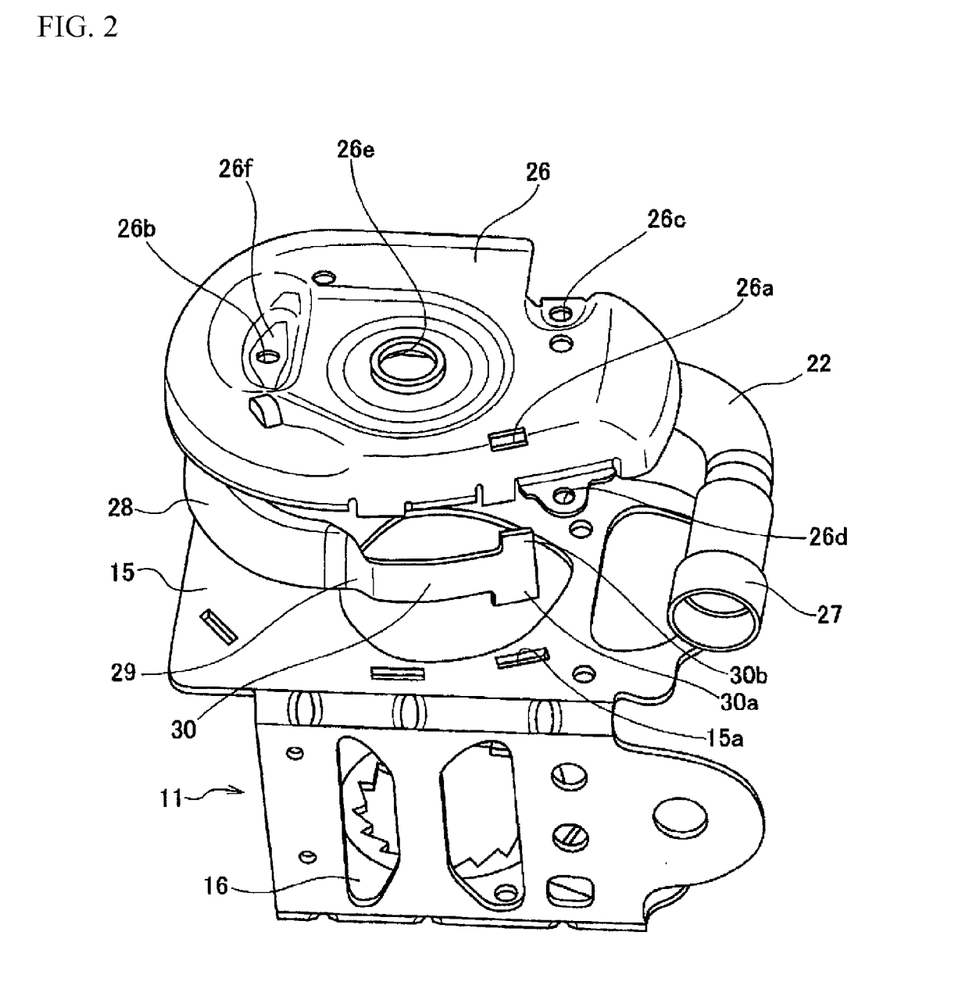
FIG. 2 is an exploded perspective view illustrating attachment of a tube pipe that is shown in FIG. 1.
Figure 3:
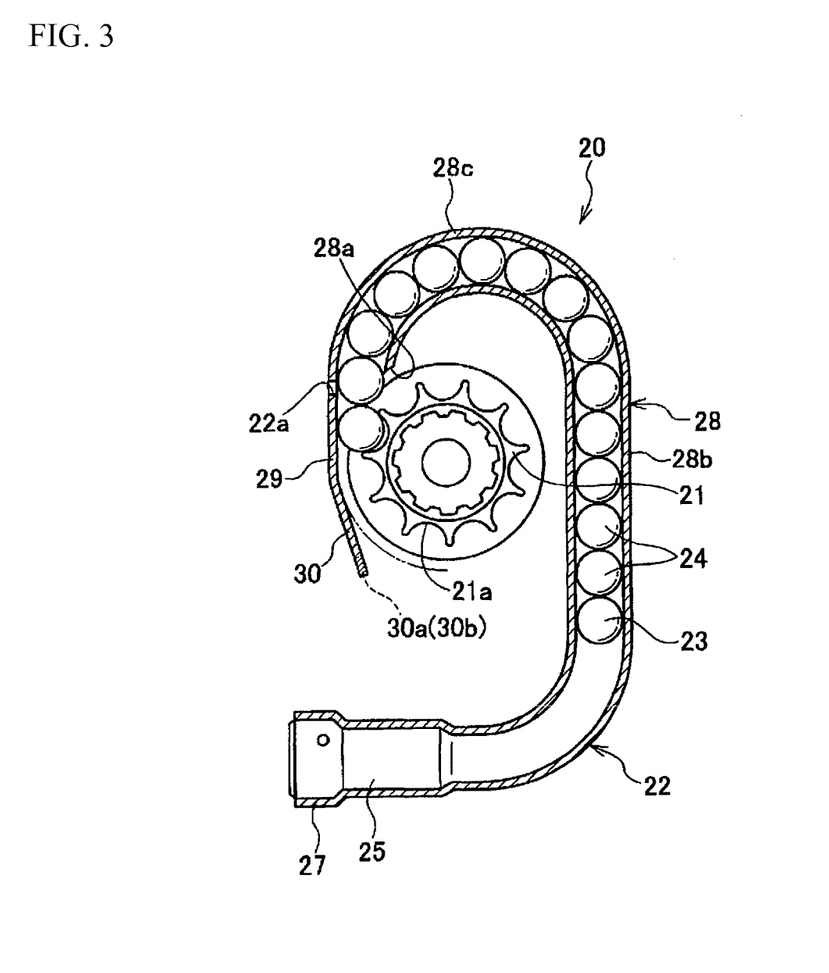
FIG. 3 is a sectional view generally taken along line III-III in FIG. 1.

As shown in FIGS. 1 to 3, the pretensioner 20 includes a pinion 21 serving as a rotary member, a tube pipe 22 serving as a guide member, a resin piston ball 23 serving as a piston member, a plurality of metal balls 24 serving as rolling bodies, a gas generator (MGG) 25 (the gas generating means) serving as gas pressure generating means, and a tube cover 26 (the guide member cover) serving as a guide member cover.

The pinion 21 is permanently joined to an axial end portion of the spindle 12 by a spline engagement so as to rotate integrally with the spindle 12. Further, a plurality of hemispherical pockets 21a for accommodating the balls 24 are provided in a circumferential direction on an outer peripheral portion of the pinion 21.

The tube pipe 22 is a pressure vessel member that is disposed around the pinion 21 and to the side of the side plate 15 of the retractor frame 11, the gas generator 25 being attached to one end portion 27 thereof. The tube pipe 22 includes a tubular part 28, an engagement portion 29, and a hook portion 30. The tubular part 28 is formed continuously from the end portion 27 of the tube pipe 22 so as to accommodate the piston ball 23 and the plurality of balls 24 and hold a gas pressure generated by the gas generator 25. The engagement portion 29 is formed from a substantially plate-shaped rectilinear outside part obtained by cutting away a pinion side inside part from an opening 28a at the other end portion of the tubular part 28, and serves as a position where the balls 24 engage with the pinion 21. The hook portion 30 guides the balls 24 by flexing toward the pinion 21 side relative to the engagement portion 29 at the other end portion of the tube pipe 22.

The tubular part 28 of the tube pipe 22 includes a rectilinear part 28b that curves from the end portion 27 disposed below the side plate 15 and extends upward in a rectilinear fashion along a free end side of the side plate 15, and a curved part 28c that passes over the pinion 21 and then extends so as to return to a base end side of the side plate 15. Further, a ball stopper, not shown in the drawings, formed from a resin clip is fitted into a hole 22a formed in the tube pipe 22 on the other end portion side of the tubular part 28.

Figure 4:
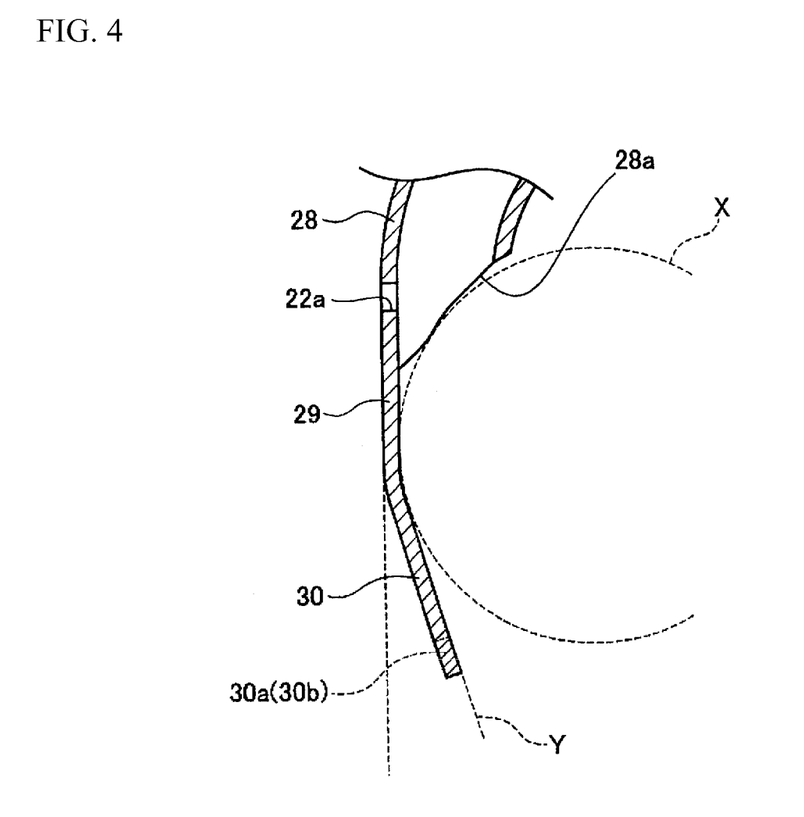
FIG. 4 is an enlarged sectional view of an engagement portion and a hook portion of the tube pipe.

As shown in FIGS. 3 and 4, the opening 28a in the tubular part 28 is formed diagonally so as to substantially follow a concentric circle X with the pinion 21. The pinion 21 is disposed close to the engagement portion 29 of the tube pipe 22 so that the balls 24 discharged through the opening 28a engage with the pinion 21. The engagement portion 29 is formed to extend substantially parallel to the rectilinear part 28b of the tubular part 28. The hook portion 30 is flexed so as to extend substantially along a tangent Y of the concentric circle X with the pinion 21. A tip end of the hook portion 30 is set in a position where a ball 24 contacting the tip end is released from the pocket 21a in the pinion 21 and a desired deformation is obtained by a force E, to be described below, in a boundary part between the engagement portion 29 and the hook portion 30.

A pair of projecting portions 30a, 30b extending to both axial direction sides are formed on the tip end part of the hook portion 30, and by inserting the respective projecting portions 30a, 30b into attachment holes 15a, 26a formed respectively in the side plate 15 of the retractor frame 11 and the tube cover 26, the hook portion 30 is fixed to the retractor frame 11 and the tube cover 26.

The tube cover 26 is fastened fixedly to the side plate 15 of the retractor frame 11 so as to cover the tube pipe 22, excluding a part near the end portion 27, by inserting fastening means, not shown in the drawings, into a plurality of fastening holes 26b, 26c, 26d, and so on. Further, a through hole 26e penetrated by the axial end portion of the spindle 12 is formed in the tube cover 26. A part 26f of the tube cover 26 provided with the fastening hole 26b is formed as a recess recessed toward the side plate 15.

Hence, the tube pipe 22 is fixed to the side plate 15 of the retractor frame 11 by the end portion 27 to which the gas generator 25 is attached, and fixed to the side plate 15 and the tube cover 26 by the tip end part of the hook portion 30. Meanwhile, the curved part 28c of the tubular part 28 is held movably by the part 26f provided with the fastening hole 26b.

The gas generator 25 is electrically connected to an MGG connector and a control circuit, not shown in the drawings, such that the gas generator 25 is ignited via the MGG connector. When an explosive/igniter is exploded/ignited such that gas is generated, the piston ball 23 is pushed directly by the gas pressure from the gas generator 25 so as to move, and the plurality of balls 24 move in accordance with the movement of the piston ball 23. Further, the balls 24 shear the ball stopper, and therefore the balls 24 are pushed out of the tube pipe 22 so as to enter and engage with the pockets 21a in the pinion 21, thereby causing the pinion 21 to rotate. Hence, the pinion 21 converts the movement of the balls 24 into a rotary motion.

Figure 5:
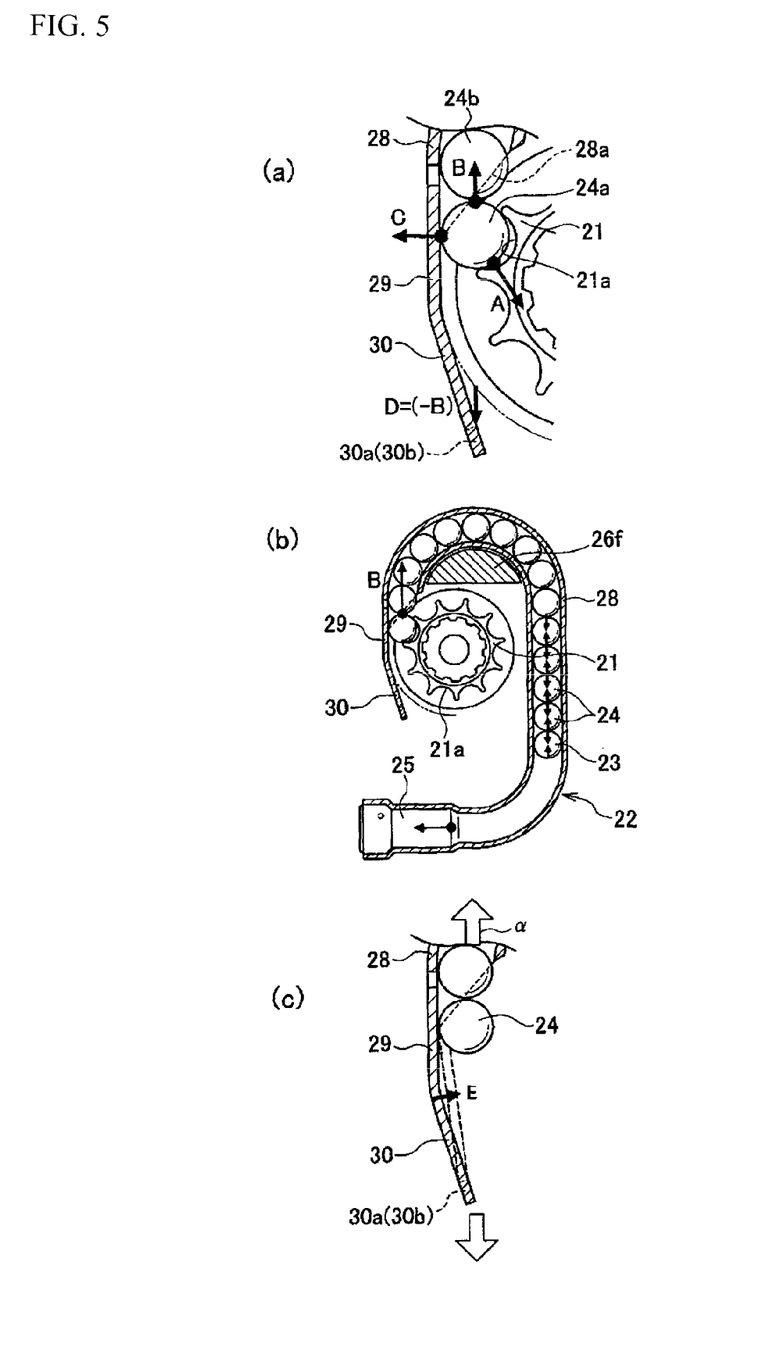
FIGS. 5A to 5C are views illustrating a deformation process of the tube pipe during a pretensioner operation.

A deformation process of the tube pipe 22 occurs when the balls 24 engage with the pinion 21 and will now be described using FIGS. 5A to 5C. As shown in FIG. 5A, when the balls 24 are pushed out through the opening 28a in the tube pipe 22, a ball 24a that engages with the pinion 21 receives a force B from a following ball 24b. Upon reception of the force B, the ball 24a pushes the pinion 21 by a force A and pushes the tube pipe 22 by a force C such that balance is achieved. As a result, the tube pipe 22 attempts to bend to the left side of the drawing.

With respect to the balance of forces in the tube pipe 22, as shown in FIG. 5B, the tube pipe 22 receives all force other than the force B, which is received by the balls 24 discharged from the tube pipe 22 when the gas generator 25 is ignited, from the ball 24a that engages with the pinion 21, regardless of the shape of the tube pipe 22. Accordingly, a force D serving as a reactive force to the force B acts on the hook portion 30.

As shown in FIG. 5C, when a force acts on the tube pipe 22 in the direction of an arrow α, the tubular part 28 of the tube pipe 22 is pulled upward, and therefore the force E acts on the boundary part between the rectilinear engagement portion 29 and the hook portion 30 flexed to the pinion side. As a result, the tube pipe 22 deforms in a rectilinear fashion, as shown by dotted lines in FIG. 5C, such that engagement between the pinion 21 and the balls 24 is secured even in the vicinity of the boundary part. Further, when the balls 24 engage with the pinion 21, the force C applied by the balls 24 to cause the tube pipe 22 to separate from the pinion 21 is turned into the force E for conversely causing the tube pipe 22 to deform toward the pinion side by the force B for pushing out the balls 24, and therefore the force C and the force E cancel each other out.

When the force in the direction of the arrow α acts on the tube pipe 22, the tubular part 28 thereof is pulled in an upward direction and therefore attempts to move upward. To ensure that this movement is not obstructed, an upper side part of the tube pipe 22 is not fixed.

As described above, in the seatbelt refractor according to this embodiment, the guide member includes the tubular part 28 extending continuously from one end portion to accommodate the piston ball 23 and the plurality of balls 24 and the hook portion 30 flexed to the pinion 21 side at the other end portion, and the tip end part of the hook portion 30 is fixed to the retractor frame 11 and the tube cover 26. The flexed part of the hook portion 30 can therefore be extended using the reactive force received by the balls 24 from the pinion 21. Accordingly, a reduction in an engagement amount between the pinion 21 and the balls 24 during a pretensioner operation can be prevented, and the engagement between the balls 24 and the pinion 21 can be held for a long time. As a result, the pinion 21 can be rotated efficiently.

Further, the hook portion 30 extends along the tangent Y of the concentric circle X with the pinion 21, and therefore the hook portion 30 can be disposed close to the pinion 21 so that engagement between the pinion 21 and the balls 24 can be secured more easily.

Furthermore, the part of the tube pipe 22 near the pinion is cut away to form the engagement portion 29, where the balls 24 engage with the pinion 21, and the hook portion 30. Hence, the hook portion 30 can be disposed close to the pinion 21, and the hook portion 30 can be deformed easily.

The curved part 28c of the tubular part 28 of the tube pipe 22 is held such that during an operation of the pretensioner 20, the curved part 28c can be moved by the reactive force received when the balls 24 engage with the pinion 21. Hence, the flexed part of the hook portion 30 can be extended by the movement of the curved part 28c.

Note that the present invention is not limited to the embodiment described above and may be subjected to appropriate modifications, amendments, and so on. Further, materials, shapes, dimensions, numbers, disposal locations, and so on of the respective constitutional elements of the above embodiment may be set arbitrarily as long as the present invention can be achieved.

In this embodiment, the tip end part of the hook portion 30 is fixed to both the retractor frame 11 and the tube cover 26, but need only be fixed to at least one of the retractor frame 11 and the tube cover 26.

Further, the tip end part of the hook portion 30 is preferably fixed directly to at least one of the retractor frame 11 and the tube cover 26 but may be fixed indirectly relative to at least one of the retractor frame 11 and the tube cover 26 using another method not described in this specification. In other words, it is sufficient for the tip end part of the hook portion 30 to be fixed either directly or indirectly to a part of a member of a retractor main body so as to be incapable of moving relative to a rotary axis of a rotary member (the pinion 21) that rotates integrally with the spindle 12 of the retractor main body.

Note that the tip end part of the hook part includes not only the tip end but also a site slightly removed from the tip end within a range allowing the actions and effects of the present invention to be exhibited.

Furthermore, the boundary part between the engagement portion 29 and the hook portion 30 of the tube pipe 22 may be flexed or curved. In other words, the bent shape of the boundary part may be set as desired as long as the balls 24 can be biased in a direction for engaging with the pinion 21 by a guide surface of the tube pipe 22 when force is applied.

The invention claimed is:

1. A seatbelt retractor for retracting a seatbelt, the seatbelt retractor comprising:
   a spindle coupled to the seatbelt for retracting the seatbelt;
   a retractor frame having a pair of side plates that support the spindle so that the spindle is free to rotate; and
   a pretensioner that is adapted to cause rotation of the spindle in a retraction direction using a gas pressure,
   wherein the pretensioner comprises:
   an igniter adapted to be ignited and generate the gas pressure;
   a rotary member that rotates integrally with the spindle;
   a guide member disposed around the rotary member and to a side of a side plate of the retractor frame, the igniter being generally attached to one end portion of the guide member;
   a piston member that is located within the guide member and adapted to be pushed within the guide member directly by the gas pressure; and
   a plurality of rolling bodies that are located within the guide member and being configured to cause the rotary member to rotate by moving in conjunction with movement of the piston member,
   the guide member further comprises a tubular part formed continuously from the one end portion to another end portion, the piston member and the plurality of rolling bodies being located within the tubular part, and the another end portion having a rectilinear engagement portion and a hook portion angled toward the rotary member, and a tip end part provided on the hook portion and being fixed relative to the retractor frame so as to be incapable of moving relative thereto, a boundary part between the rectilinear engagement portion and the hook portion, the boundary part being configured to deform in a rectilinear fashion when the igniter generates the gas pressure.

2. The seatbelt retractor according to claim 1, further comprising a guide member cover that is attached to one of the side plates of the retractor frame so as to cover the guide member,
   wherein the tip end part of the hook portion is immovably attached to at least one of the retractor frame and the guide member cover.

3. The seatbelt retractor according to claim 1, wherein the hook portion extends along a tangent of a circle that is concentric with the rotary member.

4. The seatbelt retractor according to claim 1, wherein a part of the guide member located near the rotary member is cut away forming an opening adjacent to an engagement portion and the hook portion where the rolling bodies engage with the engagement portion and the rotary member.

5. The seatbelt retractor according to claim 1, wherein the tubular part of the guide member is coupled to the refractor plate such that during operation of the pretensioner, the tubular part is configured to be moved by a reactive force received by the rolling bodies when the rolling bodies engage with the rotary member.

* * * * *